United States Patent
Kim et al.

(10) Patent No.: US 11,437,909 B2
(45) Date of Patent: Sep. 6, 2022

(54) DC-TO-DC CONVERTER CAPABLE OF OPERATING DESPITE CAPACITOR FAILURE

(71) Applicants: Hyundai Motor Company, Seoul (KR); KIA Motors Corporation, Seoul (KR)

(72) Inventors: Jung Hwi Kim, Gyeonggi-do (KR); Jung Mo Yu, Seoul (KR); Yong Jae Lee, Gyeonggi-do (KR); Jae Ho Hwang, Daejeon (KR); Joo Young Park, Gyeonggi-do (KR); Jae Hyeon Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/037,236

(22) Filed: Sep. 29, 2020

(65) Prior Publication Data

US 2021/0313892 A1 Oct. 7, 2021

(30) Foreign Application Priority Data

Apr. 1, 2020 (KR) .......................... 10-2020-0040005

(51) Int. Cl.
*H02M 3/158* (2006.01)
*G05F 1/56* (2006.01)
(Continued)

(52) U.S. Cl.
CPC ............ *H02M 3/1588* (2013.01); *G05F 1/56* (2013.01); *H02M 1/32* (2013.01); *H02M 3/06* (2013.01); *H02M 3/33569* (2013.01)

(58) Field of Classification Search
CPC ............ H02M 3/02; H02M 3/04; H02M 3/06; H02M 3/07–078; H02M 3/10;
(Continued)

(56) References Cited

U.S. PATENT DOCUMENTS 7,746,041 B2 6/2010 Xu et al.
9,893,619 B2 * 2/2018 Kihara .................... H02M 1/36
(Continued)

FOREIGN PATENT DOCUMENTS

JP 2011055612 A * 3/2011
JP 5975687 B2 8/2016
JP 6223609 B2 11/2017

OTHER PUBLICATIONS

English translation of JP-2011055612-A. (Year: 2011).*

*Primary Examiner* — Thienvu V Tran
*Assistant Examiner* — Carlos O Rivera-Perez
(74) *Attorney, Agent, or Firm* — Morgan, Lewis & Bockius LLP

(57) ABSTRACT

A DC-to-DC converter includes a first capacitor, first to fourth switches connected in series between first and second electrodes of the first capacitor, a second capacitor connected to a connection node of the first switch and the second switch and a connection node of the third switch and the fourth switch, an inductor connected to a connection node of the second switch and the third switch, and a controller that performs PWM control. In a case where a failure occurs in the second capacitor, the DC-to-DC converter performs PWM control such that the first switch and the second switch enter the same state and the third switch and the fourth switch enter the same state on the basis of a result of comparison between a first detection voltage that is a measured output voltage and a target output voltage of the DC-to-DC converter.

11 Claims, 6 Drawing Sheets

(51) Int. Cl.
*H02M 3/335* (2006.01)
*H02M 3/06* (2006.01)
*H02M 1/32* (2007.01)

(58) Field of Classification Search
CPC ...... H02M 3/135; H02M 3/137; H02M 3/139; H02M 3/155; H02M 3/156; H02M 3/157; H02M 3/158; H02M 3/1582; H02M 3/1588; H02M 3/335; H02M 3/33569; H02M 1/0009; H02M 1/0083; H02M 1/0085; H02M 1/0095; H02M 1/32; H02M 1/325; H02M 1/36; H02M 7/483; H02M 7/4833; H02M 7/4835; H02M 7/487; H02M 7/4837; H02M 7/49; G05F 1/46; G05F 1/56; G05F 1/569; G05F 1/571; G05F 1/573
USPC ........ 323/222–226, 271–277, 280, 282–286, 323/299, 351; 361/15–18, 78, 79, 86, 88, 361/90, 91.1
See application file for complete search history.

(56) References Cited

U.S. PATENT DOCUMENTS

| | | |
|---|---|---|
| 10,044,280 B2 | 8/2018 | Kondo et al. |
| 2015/0091532 A1* | 4/2015 | Kvieska ................. H02J 7/022 |
| | | 320/137 |
| 2017/0250617 A1* | 8/2017 | Kondo .............. H02M 3/33569 |
| 2017/0271989 A1* | 9/2017 | Ikeda ...................... H02M 1/08 |

* cited by examiner

DC-TO-DC CONVERTER CAPABLE OF OPERATING DESPITE CAPACITOR FAILURE

CROSS REFERENCE TO RELATED APPLICATION

The present application claims priority to Korean Patent Application No. 10-2020-0040005, filed Apr. 1, 2020, the entire contents of which are incorporated herein for all purposes by this reference.

TECHNICAL FIELD

The present disclosure relates to a DC-to-DC converter and, more particularly, to a flying DC-to-DC converter that can stably operate even when the voltage of a flying capacitor thereof cannot be controlled due to an open-circuit or short-circuit failure in the flying capacitor.

BACKGROUND

A DC-to-DC converter that converts a source of direct current (DC) from one voltage level to another is widely used in various electronic devices.

Regarding a conventional DC-to-DC converter, a technique of converting the voltage of a DC supply to another voltage by controlling the amount of energy accumulation and the amount of energy discharge of an inductor through an on/off operation of a semiconductor switch is known. This type of DC-to-DC converter has a disadvantage that the inductor is large and heavy.

To solve this problem, i.e., to reduce the size and weight of an inductor, the inductance of the inductor needs to be reduced. To this end, a technique of reducing a voltage applied to the inductor by charging and discharging a capacitor has been developed.

Among many DC-to-DC converters using such a technique, there is a DC-to-DC converter that includes a series of switches and a flying capacitor disposed between two adjacent switches of the series of switches.

Such a DC-to-DC converter with a flying capacitor has a problem in that its control is difficult because the voltage of the flying capacitor needs to be maintained at a predetermined level (for example, half an output voltage of the converter).

When an open-circuit or short-circuit failure occurs in the flying capacitor, it is impossible to maintain the voltage of the flying capacitor. In this case, there is a risk that an excessively high voltage is applied to the switches, resulting in switch burnout.

The foregoing is intended merely to aid in the understanding of the background of the present disclosure, and is not intended to mean that the present disclosure falls within the purview of the related art that is already known to those skilled in the art.

SUMMARY OF THE DISCLOSURE

One objective of the present disclosure is to provide a flying DC-to-DC converter that can stably operate even when the voltage of a flying capacitor cannot be controlled due to an open-circuit or short-circuit failure occurring in a flying capacitor thereof.

In order to accomplish the objective, according to one aspect of the present disclosure, there is provided a DC-to-DC converter including: a first capacitor; first to fourth switches connected in series between a first electrode and a second electrode of the first capacitor; a second capacitor having a first electrode and a second electrode respectively to a connection node of the first switch and the second switch and a connection node of the third switch and the fourth switch; an inductor having a first terminal connected to a connection node of the second switch and the third switch; and a controller that, in a case where an open-circuit or short circuit failure occurs in the second capacitor, performs pulse width modulation (PWM) control such that the first switch and the second switch enter the same state and the third switch and the fourth switch enter the same state, according to a result of comparison between a first detection voltage that is a measured output voltage and an output voltage instruction value that is a target output voltage. The output voltage is a voltage between the first electrode and the second electrode of the first capacitor or a voltage between the inductor and a connection node of the first capacitor and the fourth switch.

In one embodiment of the present disclosure, in a case where an open-circuit or short-circuit failure occurs in the second capacitor, the controller may generate an inductor current instruction value that is a target inductor current according to a result of comparison between the first detection voltage and the output voltage instruction value, generate a first control voltage instruction value according to a result of comparison between the inductor current instruction value and an actual detection current of the inductor, and perform PWM control such that the first switch and the second switch enter the same state and the third switch and the fourth switch enter the same state, according to a result of comparison between the first control voltage instruction value and a triangular wave signal having a preset frequency.

In one embodiment of the present disclosure, when the PWM control is performed such that the first switch and the second switch enter the same state and the third switch and the fourth switch enter the same state, the controller may reduce a step-up ratio of the DC-to-DC converter.

In one embodiment of the present disclosure, the controller may transfer a control state of the DC-to-DC converter to an upper-level controller that generates the output voltage instruction value to reduce the step-up ratio of the DC-to-DC converter.

In one embodiment of the present disclosure, when the PWM control is performed such that the first switch and the second switch enter the same state and the third switch and the fourth switch enter the same state, the controller may increase a switching frequency of each of the first to fourth switches.

In one embodiment of the present disclosure, when the PWM control is performed such that the first switch and the second switch enter the same state and the third switch and the fourth switch enter the same state, the controller may impose a limitation on the current instruction value.

In one embodiment of the present disclosure, the controller may include: a voltage controller that generates a current instruction value with respect to the current flowing through the inductor according to a difference between the first detection voltage and the output voltage instruction value; a current controller that generates a first control voltage instruction value according to a difference between the current instruction value and the detection current; and a flying capacitor voltage controller that generates a second control voltage instruction value according to a difference between the second detection voltage and the second voltage instruction value and a reciprocal of the detection current. In the case where an open-circuit or short-circuit occurs in the second capacitor, operation of the flying capacitor voltage controller may be stopped and the PWM control is performed such that the first switch and the second switch enter the same state and the third switch and the fourth switch enter the same state according to a result of comparison between the first control voltage instruction value and a triangular wave signal having a preset frequency.

According to the present disclosure, in a state in which the voltage of the flying capacitor of the flying DC-to-DC converter cannot be controlled, i.e. in which an open-circuit or short-circuit failure occurs in the flying capacitor, the PWM control is performed such that the upper-side switches than the inductor enter the same state and the lower-side switches than the inductor enter the same state. With this control, the flying DC-to-DC converter can stably operate as a two-level converter, without being interrupted by the failure in the flying capacitor.

In the case where the DC-to-DC converter operates as a two-level converter, the step-up ratio is reduced to prevent an over-voltage from being applied to the switches, and the heat generation problem is solved by increasing the switching frequency or the current de-rating.

The effects and advantages that can be achieved by the present disclosure are not limited to the ones mentioned above, and other effects and advantages which are not mentioned above but can be achieved by the present disclosure can be clearly understood by those skilled in the art from the following description.

BRIEF DESCRIPTION OF THE DRAWINGS

The above and other objects, features, and other advantages of the present disclosure will be more clearly understood from the following detailed description taken in conjunction with the accompanying drawings, in which.

DESCRIPTION OF THE PREFERRED EMBODIMENTS

Hereinafter, DC-to-DC converters according to various embodiments of the present disclosure will be described in detail with reference to the accompanying drawings.

Figure 1:
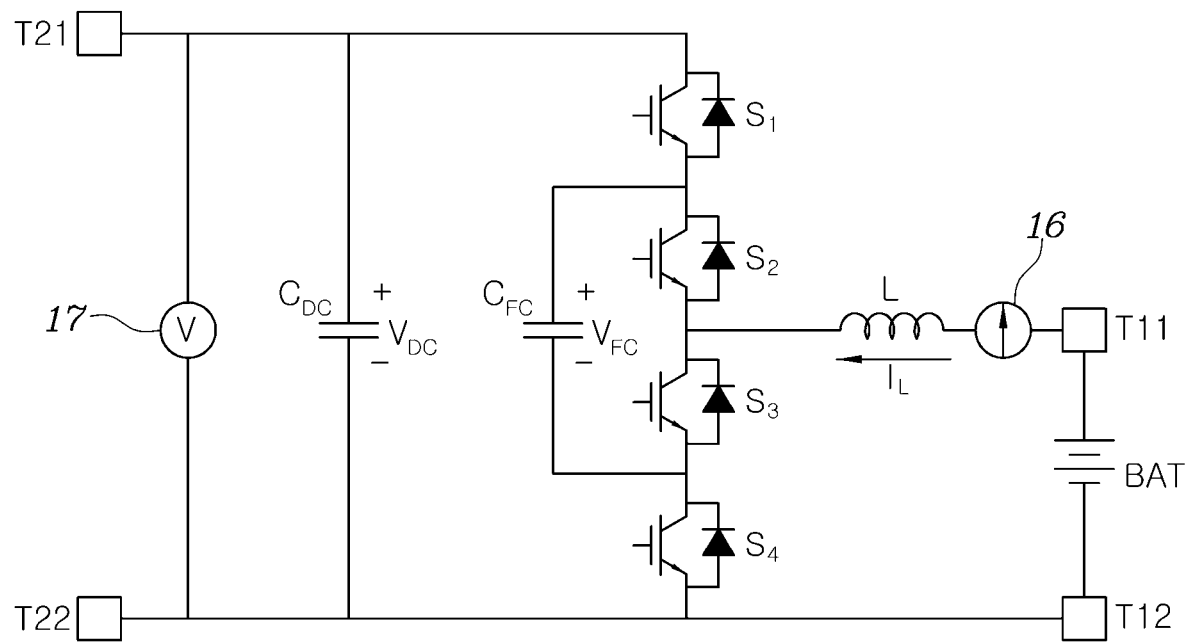
FIG. 1 is a circuitry diagram illustrating a DC-to-DC converter according to one embodiment of the present disclosure.
Figure 1:
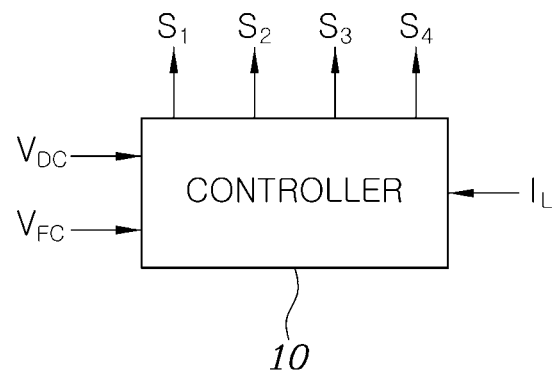

FIG. 1 is a circuit diagram of a DC-to-DC converter according to one embodiment of the present disclosure.

Referring to FIG. 1, a DC-to-DC converter according to one embodiment of the present disclosure converts a voltage applied between a first input/output (I/O) terminal T11 and a second I/O terminal T12 to a higher voltage, and supplies the raised voltage between a third I/O terminal T21 and a fourth I/O terminal T22. On the contrary, the DC-to-DC converter converts a voltage applied between the third I/O terminal T21 and the fourth I/O terminal T22 to a lower voltage and supplies the generated lower voltage between the first I/O terminal T11 and the second I/O terminal T12. FIG. 1 illustrates an exemplary converter that includes a battery BAT disposed between the first I/O terminal T11 and the second I/O terminal T12, raises the voltage of a supply current of the battery BAT to a higher voltage, and supplies the generated higher voltage between the third I/O terminal T21 and the fourth I/O terminal T22. For example, a load is connected between the third I/O terminal T21 and the fourth I/O terminal T22.

The following description relates to an example in which a voltage resulting from stepping up an output voltage of the battery BAT is applied between the third I/O terminal T21 and the fourth I/O terminal T22. However, those skilled in the art will appreciate that the reverse flow is possible. That is, the voltage applied between the third I/O terminal T21 and the fourth I/O terminal T22 is stepped down and the resulting lowered voltage is applied between the first I/O terminal T11 and the second I/O terminal T12.

A DC-to-DC converter according to one embodiment of the present disclosure includes: a first capacitor $C_{DC}$ having a first electrode and a second electrode respectively connected to a third I/O terminal T21 and a fourth I/O terminal T22; first to fourth switches $S_1$, $S_2$, $S_3$, and $S_4$ that are connected in series between the first electrode and the second electrode of the first capacitor $C_{DC}$; a second capacitor $C_{FC}$ having a first electrode and a second electrode respectively connected to a connection node between the first switch $S_1$ and the second switch $S_2$ and a connection node between the third switch $S_3$ and the fourth switch $S_4$; an inductor L having a first terminal connected to a connection node between the second switch $S_2$ and the third switch $S_3$; and a controller 10 that controls an on/off state of each of the first to fourth switches $S_1$ to $S_4$. In one example, the outputs $S_1$ to $S_4$ from the controller 10 may be respectively connected to gates of the first to fourth switches $S_1$ to $S_4$.

The first capacitor $C_{DC}$ is a smoothing capacitor connected between the third I/O terminal T21 and the fourth I/O terminal T22. Although not illustrated in FIG. 1, an additional smoothing capacitor may be connected between the first I/O terminal T11 and the second I/O terminal T12.

The first to fourth switches $S_1$ to $S_4$ are connected in series in this order from the first electrode side to the second electrode side of the first capacitor $C_{DC}$. Each of the first to fourth switches $S_1$ to $S_4$ is implemented with an insulated gate bipolar transistor (IGBT). Each of the switches is turned on or off according to an on/off control signal that is input to the gate thereof from the controller 10. Alternatively, each of the first to fourth switches $S_1$ to $S_4$ may be implemented with any arbitrary switching element known in the art instead of the IGBT. The second capacitor $C_{FC}$ is a flying capacitor in which the first electrode and the second electrode thereof are respectively connected to the connection node between the first switch $S_1$ and the second switch $S_2$ and the connection node between the third switch $S_3$ and the fourth switch $S_4$.

Although not illustrated in the drawings, the DC-to-DC converter according to one embodiment of the present disclosure may include a plurality of sensors for detecting internal circuitry information that is used by the controller 10 to generate the on/off control signal for each of the first to fourth switches $S_1$ to $S_4$. The plurality of sensors may include a voltage sensor 17 for measuring the voltage between the first I/O terminal T11 and the second I/O terminal T12 or the voltage $V_{DC}$ between the third I/O terminal T21 and the fourth I/O terminal T22, a voltage sensor for measuring the voltage $V_{FC}$ of the second capacitor $C_{FC}$, and a current sensor 16 for measuring the current $I_L$ flowing through the inductor L. The voltage values and the current values measured by the voltage sensors and the current sensor are input to the controller 10.

The controller 10 receives a first detection voltage that is the actually measured voltage between the first electrode and the second electrode of the first capacitor $C_{DC}$ or between a second terminal of the inductor L and the connection node of the first capacitor $C_{DC}$ and the fourth switch $S_4$. The first detection voltage corresponds to an output voltage obtained through a step-up operation or an output voltage obtained through a step-down operation of the DC-to-DC converter. In the case of the step-up operation, the first detection voltage corresponds to the voltage between the third I/O terminal T21 and the fourth I/O terminal T22 (i.e., the voltage of the first capacitor $C_{DC}$). In the case of the step-down operation, the first detection voltage corresponds to the voltage between the first I/O terminal T11 and the second I/O terminal T12.

The controller 10 compares the first detection voltage against a first voltage instruction value, and calculates a difference therebetween. The first voltage instruction value refers to a target voltage that is set to be output from the DC-to-DC converter. The first voltage instruction value is set by an upper-level controller. In one example, a set value or a preset value may be stored in a storage and may be read by the controller 10, or may be transmitted to the controller 10 from the upper-level controller.

When the second capacitor $C_{FC}$ that is a flying capacitor normally operates, the controller receives a second detection voltage $V_{FC}$ that is the voltage applied to the second capacitor $C_{FC}$, compares the second detection voltage $V_{FC}$ with a second voltage instruction value that is preset, and calculates a difference therebetween. The second voltage instruction value is preset by the upper-level controller and is about half the voltage of the first capacitor $C_{DC}$. According to one embodiment of the present disclosure, the controller 10 performs PWM control to determine the on/off state of each of the switches $S_1$ to $S_4$ on the basis of the product of the actually measured current of the inductor L and the difference between the detection voltage $V_{FC}$ applied to the second capacitor $C_{FC}$ and the second voltage instruction value.

In a case where an open-circuit or short-circuit failure occurs in the second capacitor $C_{FC}$ and thus the voltage of the second capacitor $C_{FC}$ cannot be controlled, the controller 10 does not perform an operation of generating the second voltage instruction value but performs PWM control to determine the on/off state of each of the switches $S_1$ to $S_4$ on the basis of the difference between the first voltage instruction value and the first detection voltage $V_{DC}$.

Although not shown, the open-circuit or short-circuit failure of the second capacitor may be determined by checking a sensing value of a voltage sensor installed in the second capacitor. This technique for determining the failure of the second capacitor is obvious to a person skilled in the art.

Figure 2:
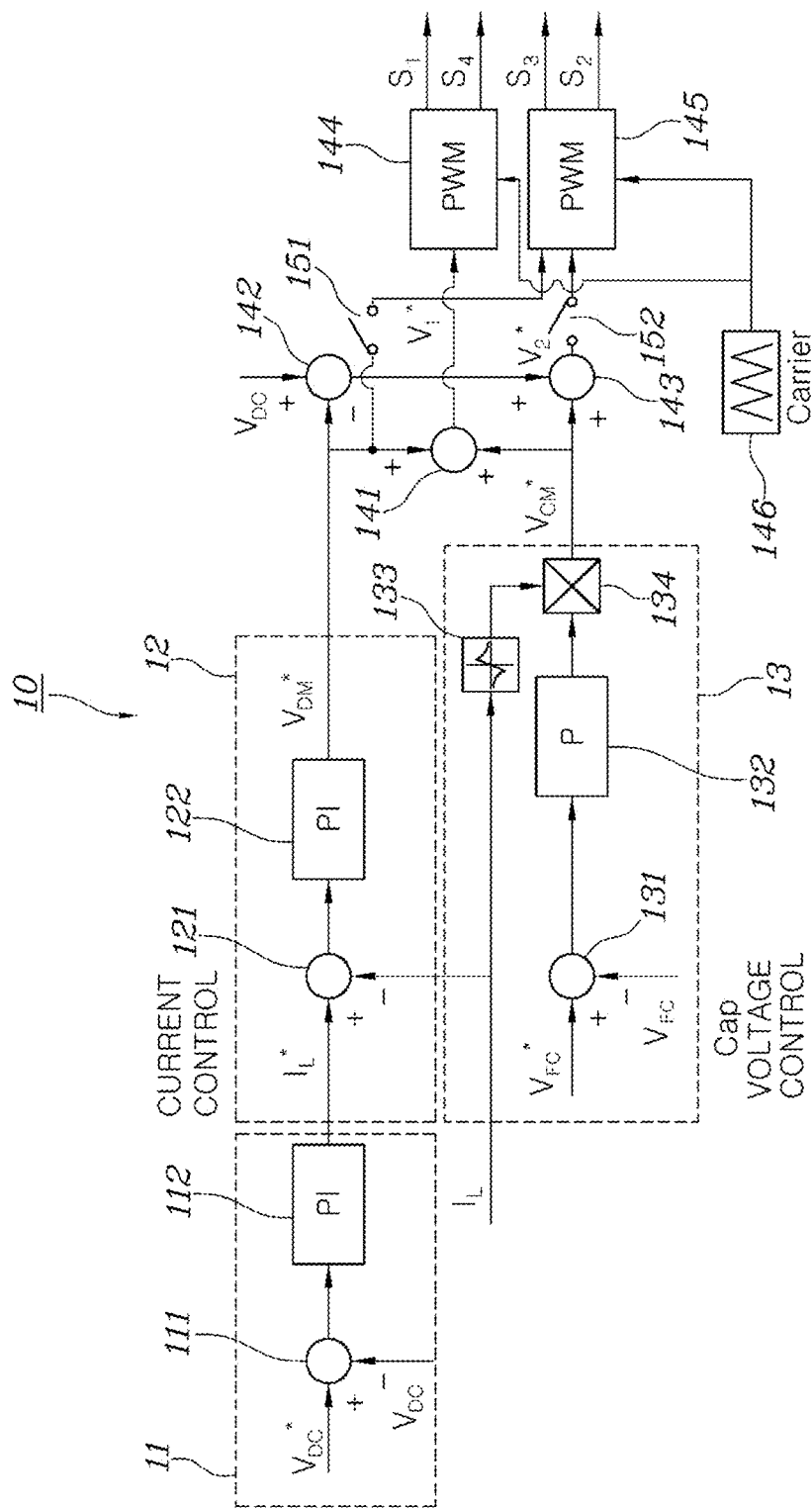
FIG. 2 is a block diagram illustrating in more detail a controller of the DC-to-DC converter according to one embodiment of the present disclosure.

FIG. 2 is a block diagram illustrating in more detail the controller of the DC-to-DC converter according to one embodiment of the present disclosure.

Referring to FIG. 2, the controller 10 of the DC-DC converter according to one embodiment of the present disclosure includes a voltage controller 11, a current controller 12, and a flying capacitor voltage controller 13.

The voltage controller 11 includes a subtractor 111 and a PI controller 112. The subtractor 111 compares the detection voltage $V_{DC}$ between the first I/O terminal T11 and the second I/O terminal T12 or the measurement voltage $V_{DC}$ between the third I/O terminal T21 and the fourth I/O terminal T22 with the first voltage instruction value $V_{DC}*$ and calculates a difference between the measurement voltage $V_{DC}$ and the first voltage instruction value $V_{DC}*$. The PI controller 112 performs a proportional integral control to reduce the difference calculated by the subtractor 111. The PI controller 112 outputs an inductor current instruction value $I_L*$ indicating a target current of the inductor L, by which the difference calculated by the subtractor 111 can be reduced, by performing the proportional integral control.

The current controller 12 includes a subtractor 121 and a PI controller 122. The subtractor 121 calculates a difference between the inductor current instruction value $I_L*$ which is provided by the voltage controller 11 and the actual detection current flowing through the inductor L. The PI controller 122 performs a proportional integral control to generate a first control voltage instruction value $V_{DM}*$ that can reduce the output value of the subtractor 121. The first control voltage instruction value $V_{DM}*$ is used to determine the on-off duty of the switches $S_1$ to $S_4$.

FIG. 2 illustrates an example in which the voltage controller 11 and the current controller 12 perform the proportional integral control. However, the control technique is not limited thereto. Various techniques known in the art may be used.

The flying capacitor voltage controller 13 includes a subtractor 131, a proportional controller 132, an inverse number calculator 133, and a multiplier 134. The subtractor 131 receives the detection voltage $V_{FC}$ applied to the second capacitor $C_{FC}$, compares the detection voltage $V_{FC}$ with a preset second voltage instruction value $V_{FC}*$, and calculates a difference therebetween. The proportional controller 132 performs a proportional control and outputs a control instruction value to reduce the output value of the subtractor 131. The reciprocal calculator 133 calculates the reciprocal of the measured inductor current $I_L$, and the multiplier 134 multiplies the output value of the proportional controller 132 by the reciprocal output from the reciprocal calculator 133 and outputs the calculated product as a second control voltage instruction value $V_{CM}*$.

In one embodiment of the present disclosure, the flying capacitor voltage controller 13 operates only in a state in which the voltage of the second capacitor $C_{FC}$ can be controlled. For example, when the voltage of the second capacitor $C_{FC}$ cannot be controlled due to a short-circuit or open-circuit failure in the second capacitor $C_{FC}$, the operation of the flying capacitor voltage controller 13 is stopped, and only the first voltage instruction value $V_{DC}*$ generated by the voltage controller 11 and the current controller 12 are used to perform the PWM control on the first to fourth switches $S_1$ to $S_4$.

In addition, the controller 10 may further include: an adder 141 that sums the first control voltage instruction value $V_{DM}*$ output from the current controller 12 and the second control voltage instruction value $V_{CM}*$ output from the flying capacitor voltage controller 13 and generates a first duty instruction value $V_1*$; a subtractor 142 that subtracts the first control voltage instruction value $V_{DM}*$ from the detection voltage $V_{DC}$ detected between the I/O terminals; a second adder 143 that adds the resultant value output from the subtractor 142 to the second control voltage instruction value $V_{CM}*$; a first switching controller 144 that determines the on/off state of the first and fourth switches $S_1$ and $S_4$ according a result of comparison between the first duty instruction value $V_1*$ and the triangular wave signal having a preset frequency generated by the triangular wave generator 146; and a second switching controller 145 that determines the on/off state of the second switch $S_2$ and the third switch $S_3$ according to a result of comparison between the second duty instruction value $V_2*$ and the triangular wave signal having a preset frequency output from the triangular wave generator 146.

When the voltage of the second capacitor $C_{FC}$ cannot be controlled due to a short-circuit or open-circuit failure in the second capacitor $C_{FC}$, the second control voltage instruction value $V_{CM}^*$ is not output from the flying capacitor voltage controller 13. Therefore, the adder 141 provides only the first voltage instruction value $V_{DC}^*$ to the first switching controller 144 so that the first and fourth switches $S_1$ and $S_4$ can be PWM-controlled. The controller 10 includes a first switching unit 151 and a second switching unit 152. When the second capacitor $C_{FC}$ normally operates, the first switching unit 151 becomes open and the switching unit 152 becomes closed. On the contrary, when the second capacitor $C_{FC}$ is abnormal, the first switching unit 151 becomes closed and the switching unit 152 becomes open. In this case, the first control voltage instruction value $V_{DC}^*$ is provided to the second switching unit 145 and thus the second and third switches $S_2$ and $S_3$ are PWM-controlled.

When the voltage of the second capacitor $C_{FC}$ cannot be controlled, the outputs of the first switching unit 144 and the second switching unit 145 are adjusted according to the first control voltage instruction value $V_{DM}^*$ and the triangular wave signal such that the first switch $S_1$ and the second switch $S_2$ enter the same state and the third switch $S_3$ and the fourth switch $S_4$ enter the same state.

When the second capacitor $C_{FC}$ normally operates, the first duty instruction value $V_1^*$ and the second duty instruction value $V_2^*$ are expressed by Equations 1, using the first control voltage instruction value $V_{DM}^*$ and the second control voltage instruction value $V_{CM}^*$.

$$V_1^* = V_{CM}^* + V_{DM}^*$$
$$V_{2^*} = V_{CM}^* + (V_{DC} - V_{DM}^*)$$
[Equations 1]

Where the first control voltage instruction value $V_{DM}^*$ is a value generated on the basis of the output voltage $V_{DC}$ of the DC-to-DC converter and has an impact on the output, and the second control voltage instruction value $V_{CM}^*$ is a value generated on the basis of the voltage $V_{FC}^*$ of the flying capacitor and has an impact on the voltage $V_{FC}^*$ of the flying capacitor or on the difference $V_{DC}-V_{FC}$ between the output voltage $V_{DC}$ and the voltage $V_{FC}$ of the flying capacitor. That is, the first control voltage instruction value $V_{DM}^*$ is used to control the output voltage of the DC-to-DC converter and the second control voltage instruction value $V_{CM}^*$ is used to control the voltage of the flying capacitor.

FIGS. 3 to 6 are diagrams illustrating a flow of current in the DC-to-DC converter according to one embodiment of the present disclosure.

Figure 3:
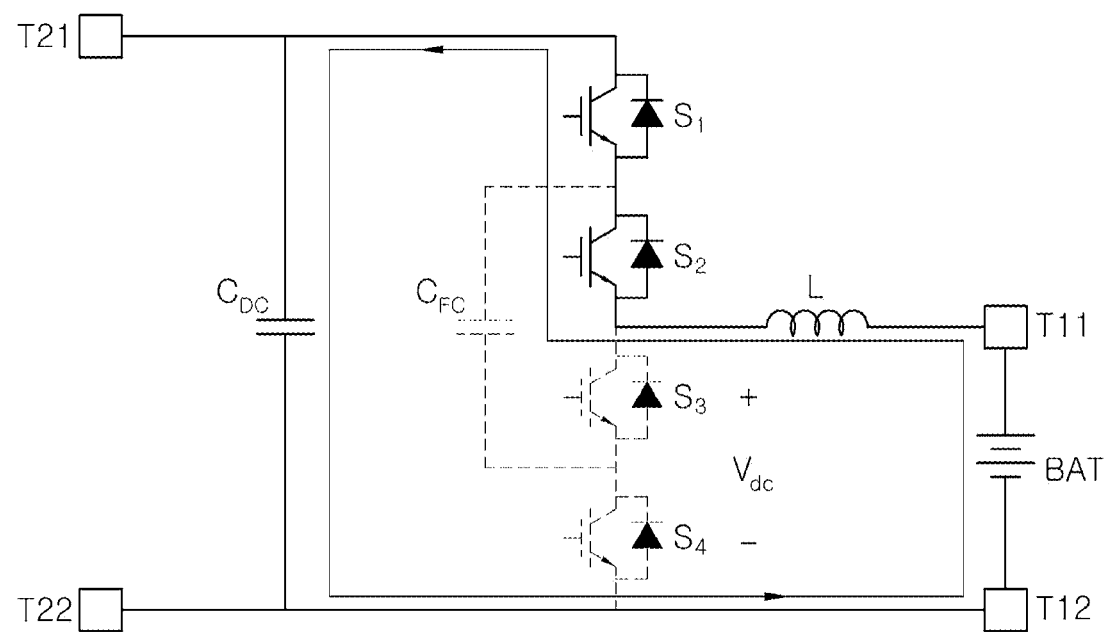
FIGS. 3 to 6 are diagrams illustrating a flow of current in the DC-to-DC converter according to one embodiment of the present disclosure.

FIG. 3 illustrates a first state in which the first switch $S_1$ and the second switch $S_2$ are turned on and the third switch $S_3$ and the fourth switch $S_4$ are turned off. The first state is created when the voltage $V_{DC}$ of the capacitor $C_{DC}$ is applied to the connection node of the inductor L and the switch $S_2$ or $S_3$.

Figure 4:
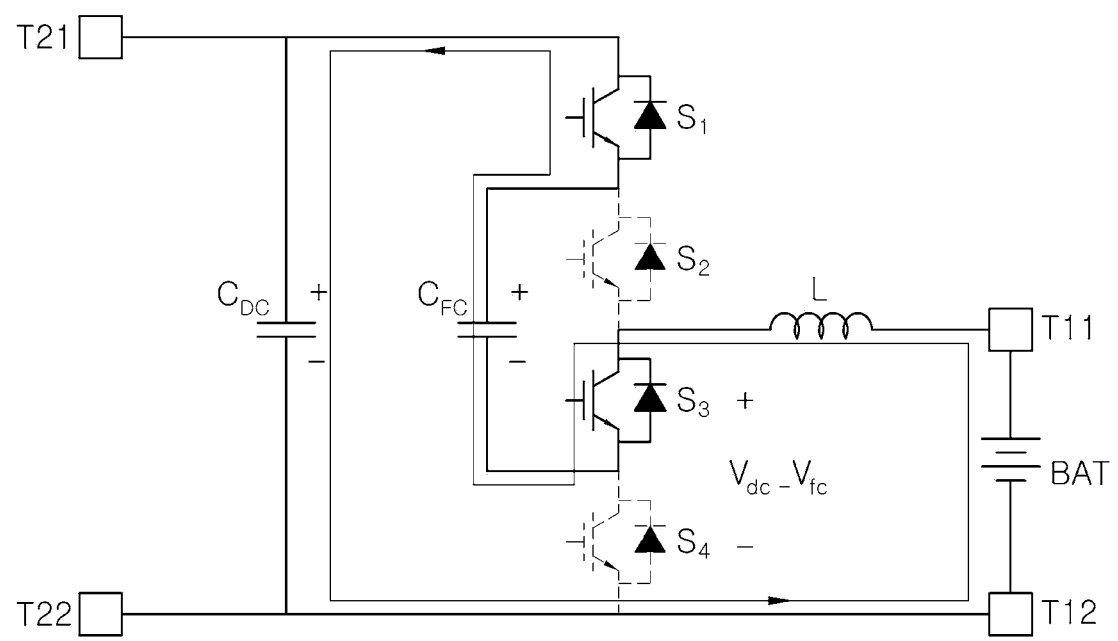

FIG. 4 illustrates a second state in which the first switch $S_1$ and the third switch $S_3$ are turned on and the second switch $S_2$ and the fourth switch $S_4$ are turned off. The second state is created when a voltage corresponding to the difference between the voltage $V_{DC}$ of the capacitor $C_{DC}$ and the voltage $V_{FC}$ of the flying capacitor $C_{FC}$ is applied to the connection node of the inductor L and the switch $S_2$ or $S_3$.

Figure 5:
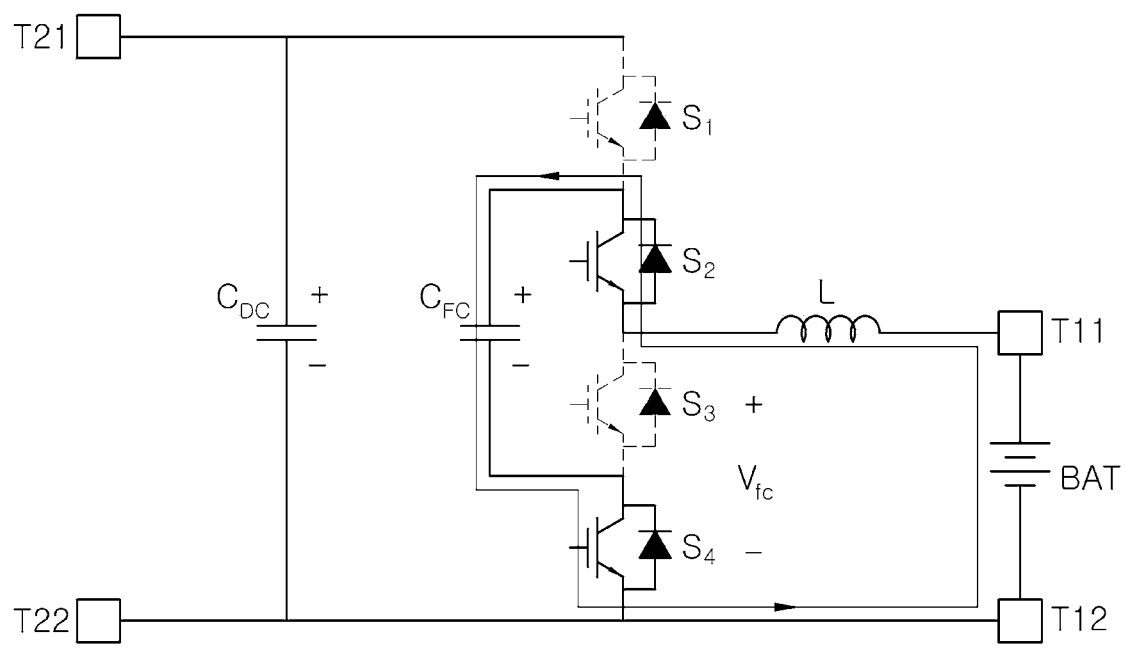

FIG. 5 illustrates a third state in which the second switch $S_2$ and the fourth switch $S_4$ are turned on and the first switch $S_1$ and the third switch $S_3$ are turned off. The third state is created when the voltage $V_{FC}$ of the flying capacitor $C_{FC}$ is applied to the connection node of the inductor L and the switch $S_2$ or $S_3$.

Figure 6:
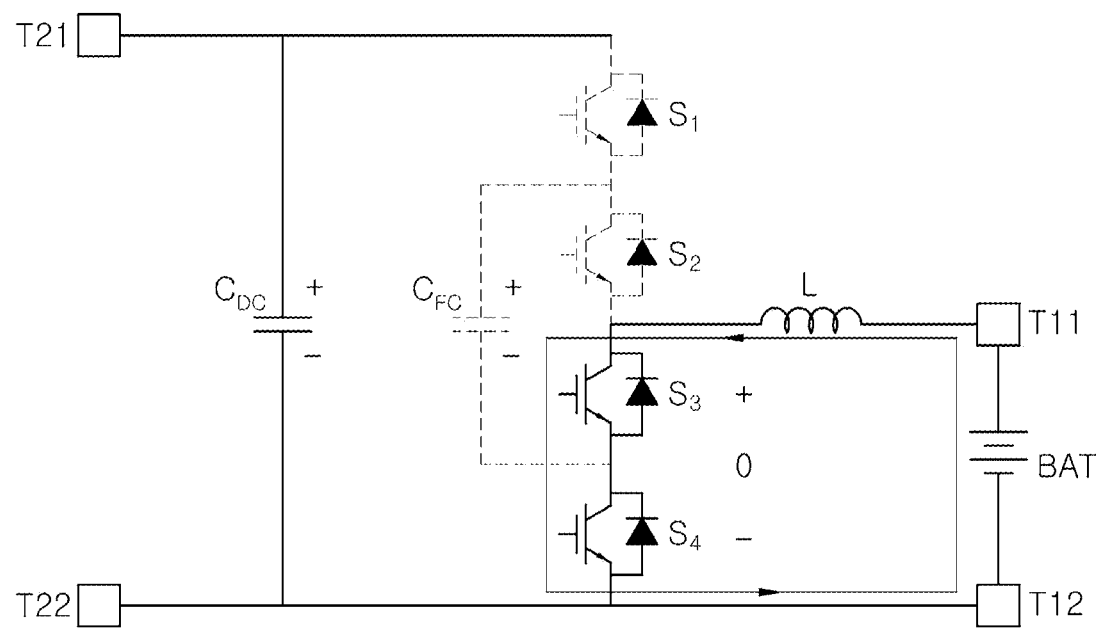

FIG. 6 illustrates a fourth state in which the first switch $S_1$ and the second switch $S_2$ are turned off and the third switch $S_3$ and the fourth switch $S_4$ are turned on. The fourth state is created when no voltage is applied to the connection node of the inductor L and the switch $S_2$ or $S_3$.

Among the states illustrated in FIGS. 3 to 6, in the second and third states in which a current flows through the second capacitor $C_{FC}$ called the flying capacitor $C_{FC}$, the voltage of the flying capacitor $C_{FC}$ changes. During the total duration of the second and third states, the electric energy charged into or discharged from the flying capacitor $C_{FC}$ depends on the current flowing through the inductor L and on a ratio of the second state and the third state.

This can be expressed by Equations 2.

$$I_{FC} = sC_{FC}V_{FC}$$
$$I_{FC} = D_{CM} \cdot I_L$$
$$D_{CM} = (V_{FC}^* - V_{FC}) \cdot K_p$$
[Equations 2]

Where "$D_{CM}$" refers to a duty at which current flows through the flying capacitor $C_{FC}$ and it is determined by the proportional control of the flying capacitor voltage controller 13 and is expressed by the third row in Equations 2. The third row in Equation 2 indicates the duty in the case where the reciprocal of the inductor current $I_L$ is not applied. In Equations 2, "$K_P$" refers to a gain of the proportional controller 132.

Equation 2 is summarized into Equation 3, and calculation of a transfer function on the basis of Equation 3 produces Equation 4.

$$(V_{FC}^* - V_{FC}) \cdot K_p \cdot I_L = sC_{FC}V_{FC}$$
[Equation 3]

$$\frac{V_{FC}}{V_{FC}^*} = \frac{\frac{K_p \cdot I_L}{C_{FC}}}{s + \frac{K_p \cdot I_L}{C_{FC}}} = \frac{\omega_{FC}}{s + \omega_{FC}}$$
[Equation 4]

To control the transfer function of Equation 4 in the form of a closed loop of a first-order low pass filter, the relationship of Equation 5 must be established.

$$K_p = \frac{C_{FC} \cdot \omega_{FC}}{I_L}$$
[Equation 5]

Equation 5 shows that the linear control characteristic can be obtained only when the gain for the proportional control is inversely proportional to the inductor current.

Therefore, with the configuration in which the flying capacitor voltage controller 13 includes the reciprocal calculator 133 for obtaining the reciprocal of the inductor current $I_L$, it is possible to obtain a stable control characteristic for the overall current.

Here, the controller in the flying capacitor voltage controller 13 may be implemented with a proportional integral (PI) controller instead of the proportional controller 132. However, when a PI controller is used, the value accumulated in the integrator is likely to generate a large duty pulsation depending on the direction of current. This means that the controllability is greatly deteriorated in the vicinity of the inductor current $I_L$ becoming zero. Therefore, it is preferable to use a proportional controller.

The output voltages in the second state and the third state in which the current flows through the second capacitor (i.e., flying capacitor) $C_{FC}$ are respectively "$V_{DC}-V_{FC}$" and "$V_{FC}$". In the normal state, an intermediate voltage $0.5*V_{DC}$ among the outputs of a three-level converter is output.

Therefore, the frequency of utilizations of the second state and the third state increases as the output pole voltage of the flying converter approaches $0.5*V_{DC}$, and the frequency of utilizations of the first state or the third state increases as the output pole voltage of the flying converter differs more largely from $0.5*V_{DC}$. In addition, when the flying capacitor $C_{FC}$ is stably controlled to output a voltage of $0.5*V_{DC}$, the ratio of the second state and the third state is 1:1 (that is, $V_{CM}*=0$).

However, when a short-circuit or open-circuit failure occurs in the second capacitor $C_{FC}$, the voltage control of the second capacitor $C_{FC}$ becomes impossible, and the three-level operation as described above becomes impossible.

In one embodiment of the present disclosure, when a short-circuit or open-circuit failure occurs in the second capacitor $C_{FC}$ and the voltage control of the second capacitor $C_{FC}$ becomes impossible, the switches $S_1$ to $S_4$ are controlled to enable a two-level operation.

To this end, in one embodiment of the present disclosure, the first and second switches $S_1$ and $S_2$, which are disposed on the upper side than the inductor L, are controlled to enter the same state, and the third and fourth switches $S_3$ and $S_4$, which are disposed on the lower side than the inductor L, are controlled to enter the same state.

When the second capacitor $C_{FC}$ fails and thus the control of the second capacitor $C_{FC}$ becomes impossible, two-level control that switches between the first state illustrated in FIG. 3 and the fourth state illustrated in FIG. 6 is performed.

In the case of the two-level control, when the DC-to-DC converter operates as a step-up converter, the full DC supply voltage is likely to be applied to some of the switches $S_1$ to $S_4$. This over voltage may result in switch burnout. Therefore, the controller 10 preferably lowers or limits the step-up ratio of the converter when the two-level control is performed due to the disability of the voltage control of the second capacitor $C_{FC}$. This can be achieved in a manner that the controller 10 sends to the upper-level controller a flag indicating that the voltage control of the second capacitor $C_{FC}$ is impossible.

When the two-level control is performed, as the ripple of the inductor L increases, the inductor loss increases. This results in exacerbation of heat generation. In order to solve the heat generation problem, it is preferable to reduce the inductor loss by increasing the switching frequency. The target switching frequency to be reached is preset, and this can be achieved by increasing the frequency of the triangular waves output from the triangular wave generator 146.

Another approach to adjust the heat generation is to de-rate the current. The de-rating can be achieved by adding a limiter (not shown) that limits the value of the current command $I_L*$ output from the voltage controller 12 to a preset value to the front stage of the current controller 12 and activating the limiter when the two-level control is performed.

The aforementioned operations/functions performed by the controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller may include one or more processors/microprocessors. The controller may be implemented with circuits. The controller may perform the above described operations/functions, by executing the computer readable code/algorithm/software stored on the computer readable recording medium.

Although the present disclosure has been described with reference to preferred embodiments, the preferred embodiments are presented to describe the technical spirit of the present disclosure only for illustrative purposes and those skilled in the art will appreciate that various modifications and changes are possible, without departing from the scope and spirit of the present disclosure. Therefore, it should be understood that the protection scope of the present disclosure is defined by the accompanying claims rather than the description which is presented above.

What is claimed is:

1. A DC-to-DC converter comprising:
   a first capacitor;
   a first switch, a second switch, a third switch, and a fourth switch connected in series between a first electrode and a second electrode of the first capacitor;
   a second capacitor having a first electrode and a second electrode respectively connected to a connection node of the first switch and the second switch and a connection node of the third switch and the fourth switch;
   an inductor connected to a connection node of the second switch and the third switch at a first terminal thereof; and
   a controller that, in a case where an open-circuit or short-circuit failure occurs in the second capacitor, limits an output voltage instruction value that is a target voltage to be output, and performs pulse width modulation (PWM) control such that the first switch and the second switch enter the same state and the third switch and the fourth switch enter the same state, according to a result of comparison between a first detection voltage that is a measured output voltage and the limited output voltage instruction value,
   wherein the output voltage is a voltage between the first electrode and the second electrode of the first capacitor, or a voltage between a second terminal of the inductor and a connection node of the first capacitor and the fourth switch,
   wherein the controller comprises:
      a voltage controller configured to generate a current instruction value for a current flowing through the inductor according to a difference between the first detection voltage and the output voltage instruction value;
      a current controller configured to generate a first control voltage instruction value according to a difference between the current instruction value and a detection current of the inductor; and
      a flying capacitor voltage controller configured to generate a second control voltage instruction value according to a difference between a second detection voltage and a second voltage instruction value and an inverse value of the detection current.

2. The DC-to-DC converter according to claim 1, wherein in a case where the open-circuit or short-circuit failure occurs in the second capacitor, the controller generates the current instruction value, generates the first control voltage instruction value, and performs PWM control according to a result of comparison between the first control voltage instruction value and a triangular wave signal having a preset frequency such that the first switch and the second switch enter the same state and the third switch and the fourth switch enter the same state.

3. The DC-to-DC converter according to claim 2, further comprising a current sensor for obtaining the detection current of the inductor.

4. The DC-to-DC converter according to claim 2, further comprising a triangular wave generator generating the triangular wave signal having the preset frequency.

5. The DC-to-DC converter according to claim 2, wherein when the PWM control is performed such that the first switch and the second switch enter the same state and such that the third switch and the fourth switch enter the same state, the controller imposes a limitation on the current instruction value.

6. The DC-to-DC converter according to claim 1, wherein when the PWM control is performed such that the first switch and the second switch enter the same state and the PWM control is performed such that the third switch and the fourth switch enter the same state, the controller reduces a step-up ratio of the DC-to-DC converter.

7. The DC-to-DC converter according to claim 6, wherein the controller transfers a control state of the DC-to-DC converter to an upper-level controller that generates the output voltage instruction value to reduce the step-up ratio of the DC-to-DC converter.

8. The DC-to-DC converter according to claim 1, wherein when the PWM control is performed such that the first switch and the second switch enter the same state and the PWM control is performed such that the third switch and the fourth switch enter the same state, the controller increases a switching frequency of each of the first to fourth switches.

9. The DC-to-DC converter according to claim 1,
wherein in the case where the open-circuit or short-circuit failure occurs in the second capacitor, operation of the flying capacitor voltage controller is stopped, and the PWM control is performed such that the first switch and the second switch enter the same state and the third switch and the fourth switch enter the same state, according to a result of comparison between the first control voltage instruction value and a triangular wave signal having a preset frequency.

10. The DC-to-DC converter according to claim 9, wherein the controller further comprises a triangular wave generator generating the triangular wave signal having the preset frequency.

11. The DC-to-DC converter according to claim 1, further comprising a voltage sensor for obtaining the measured output voltage.

\* \* \* \* \*